(12) United States Patent
Solki

(10) Patent No.: US 10,614,184 B2
(45) Date of Patent: Apr. 7, 2020

(54) SEMICONDUCTOR PROCESS AND PERFORMANCE SENSOR

(71) Applicant: Atlazo, Inc., La Jolla, CA (US)

(72) Inventor: Shahin Solki, La Jolla, CA (US)

(73) Assignee: ATLAZO, INC., La Jolla, CA (US)

( * ) Notice: Subject to any disclaimer, the term of this patent is extended or adjusted under 35 U.S.C. 154(b) by 0 days.

(21) Appl. No.: 16/242,405

(22) Filed: Jan. 8, 2019

(65) Prior Publication Data

US 2019/0213292 A1  Jul. 11, 2019

Related U.S. Application Data

(60) Provisional application No. 62/614,909, filed on Jan. 8, 2018.

(51) Int. Cl.
*G06F 17/50* (2006.01)
*H03K 19/003* (2006.01)

(52) U.S. Cl.
CPC ........ *G06F 17/5031* (2013.01); *G06F 17/505* (2013.01); *G06F 17/5081* (2013.01);
(Continued)

(58) Field of Classification Search
CPC .......... H03K 19/00369; G07C 9/00563; G07C 9/00571; G07C 9/00817; G07C 2009/00825; G06Q 10/0832; G06F 17/505; G06F 17/5081; G06F 2217/80; G06F 2217/84; G06F 17/5031
See application file for complete search history.

(56) References Cited

U.S. PATENT DOCUMENTS 5,481,178 A   1/1996  Wilcox
6,636,022 B2  10/2003 Sluijs
(Continued)

FOREIGN PATENT DOCUMENTS

JP   2014064436 A1   4/2014

OTHER PUBLICATIONS

David M. Harris et al., "A transregional model for near-threshold circuits with application to minimum-energy operation," in Proc. 2010 Int. Conf. Microelectronics (ICM), Cairo, Egypt, Dec. 19-22, 2010, pp. 64-67.
(Continued)

*Primary Examiner* — Stacy Whitmore
(74) *Attorney, Agent, or Firm* — Perkins Coie LLP

(57) ABSTRACT

Disclosed are techniques that can be used in a semiconductor chip to determine performance such as timing performance. Among other features, supply voltages and clock rates may be adjusted to accommodate the operating temperature and to compensate for the processing variations that occurred when that chip was produced, or may occur as the chip is used. The techniques include determining a series of variables that affect performance, determining the sensitivity of timing paths in the circuit to each variable, duplicating the most sensitive paths. A novel sensor circuit is produced that includes the sensitive paths, which can be used to determine when the chip is performing as required and when it is not, and adjusting one or more supply voltages and/or clock rates in a static or real time manner when the circuit is not performing as required.

24 Claims, 5 Drawing Sheets

(52) U.S. Cl.
CPC ...... *G06F 2217/80* (2013.01); *G06F 2217/84* (2013.01); *H03K 19/00369* (2013.01)

(56) References Cited

U.S. PATENT DOCUMENTS

| | | | |
|---|---|---|---|
| 7,174,523 B2* | 2/2007 | Engel | G06F 17/5031 716/108 |
| 7,298,119 B1 | 11/2007 | Summit et al. | |
| 7,487,474 B2* | 2/2009 | Ciplickas | G06F 17/5045 716/112 |
| 7,552,409 B2* | 6/2009 | Kucukcakar | G06F 17/5068 703/16 |
| 7,913,071 B2 | 3/2011 | Mallik | |
| 8,018,212 B1 | 9/2011 | Petricek | |
| 8,049,568 B2 | 11/2011 | Youssef et al. | |
| 8,051,398 B2* | 11/2011 | Bittlestone | G06F 17/505 716/111 |
| 8,129,961 B2 | 3/2012 | Buethker | |
| 8,169,203 B1 | 5/2012 | Vemula | |
| 8,307,317 B2* | 11/2012 | Adams | G06F 17/5031 716/113 |
| 8,464,199 B1* | 6/2013 | Charlebois | G06F 17/5068 716/113 |
| 8,543,966 B2* | 9/2013 | Bickford | G01R 31/31726 714/724 |
| 8,692,584 B2 | 4/2014 | Nakamura et al. | |
| 9,281,780 B2 | 3/2016 | Yayama et al. | |
| 9,317,048 B2 | 4/2016 | Kuang | |
| 9,408,266 B2 | 8/2016 | Logiudice | |
| 9,503,106 B1 | 11/2016 | Ding et al. | |
| 9,698,674 B1 | 7/2017 | Cherkassky et al. | |
| 9,829,911 B2 | 11/2017 | Yayama et al. | |
| 9,915,963 B1 | 3/2018 | Wu | |
| 10,222,852 B2* | 3/2019 | Foreman | G06F 17/5031 |
| 10,236,763 B2 | 3/2019 | Hu | |
| 10,416,746 B2 | 9/2019 | Solki et al. | |
| 2005/0184711 A1 | 8/2005 | Chen et al. | |
| 2006/0114017 A1* | 6/2006 | El-Kik | H03K 19/00369 326/32 |
| 2007/0018712 A1* | 1/2007 | Gk | H03K 19/00369 327/512 |
| 2007/0089078 A1* | 4/2007 | Engel | G06F 17/5031 700/121 |
| 2008/0122291 A1 | 5/2008 | Uchimoto | |
| 2009/0037854 A1* | 2/2009 | Bittlestone | G06F 17/505 716/139 |
| 2009/0284240 A1 | 11/2009 | Zhang | |
| 2010/0052635 A1 | 3/2010 | Wang | |
| 2010/0194434 A1* | 8/2010 | Tran Vo | H03K 5/135 326/93 |
| 2010/0327952 A1* | 12/2010 | Wu | H03K 19/00369 327/513 |
| 2011/0248764 A1 | 10/2011 | Das | |
| 2011/0267017 A1 | 11/2011 | Zhang et al. | |
| 2012/0124538 A1* | 5/2012 | Lackey | G01R 31/318307 716/113 |
| 2012/0159216 A1 | 6/2012 | Wells | |
| 2013/0069608 A1 | 3/2013 | Gakhar et al. | |
| 2013/0099764 A1 | 4/2013 | Zhang et al. | |
| 2013/0271100 A1 | 10/2013 | El-Nozahi | |
| 2014/0152344 A1* | 6/2014 | Chiou | H03K 19/00369 326/93 |
| 2014/0225579 A1 | 8/2014 | Dally | |
| 2014/0232360 A1 | 8/2014 | Dally | |
| 2015/0198960 A1 | 7/2015 | Zhang et al. | |
| 2015/0214841 A1 | 7/2015 | Ramorini et al. | |
| 2016/0077537 A1 | 3/2016 | Enjalbert et al. | |
| 2016/0094125 A1 | 3/2016 | Milanesi et al. | |
| 2016/0118894 A1 | 4/2016 | Zhang | |
| 2016/0164497 A1* | 6/2016 | Agarwal | H03K 3/011 327/437 |
| 2016/0334818 A1 | 11/2016 | Singh | |
| 2016/0359421 A1 | 12/2016 | Lin | |
| 2017/0033698 A1 | 2/2017 | Vemuri | |
| 2017/0093350 A1 | 3/2017 | Ramos et al. | |
| 2017/0115678 A1 | 4/2017 | Qing et al. | |
| 2017/0160757 A1 | 6/2017 | Yang | |
| 2017/0272073 A1 | 9/2017 | Betz | |
| 2018/0120879 A1 | 5/2018 | Du et al. | |
| 2018/0173258 A1 | 6/2018 | Singh | |
| 2018/0284829 A1 | 10/2018 | Hussien et al. | |
| 2018/0321092 A1* | 11/2018 | Jones | G01K 7/24 |
| 2019/0131876 A1 | 5/2019 | Luff | |
| 2019/0212799 A1 | 7/2019 | Solki et al. | |
| 2019/0214906 A1 | 7/2019 | Mahmoudi | |
| 2019/0235566 A1 | 8/2019 | Ensafdaran | |
| 2019/0258283 A1 | 8/2019 | Pishdad et al. | |
| 2019/0280593 A1 | 9/2019 | Hedayati et al. | |

OTHER PUBLICATIONS

S. Kosonocky et al., "Designing in Scaled Technologies: 32nm and Beyond," presented at 2012 Symposia on VLSI Technology and Circuits, Honolulu, HI, Jun. 2012.

Jungseob Lee et al., "Improving Throughput of Power-Constrained GPUs Using Dynamic Voltage/Frequency and Core Scaling," in Proc. 2011 Int. Conf. Parallel Architectures and Compilation Techniques (PACT), Galveston, TX, Oct. 10-14, 2011, pp. 111-120.

Massimo Alioto, "Ultra-Low Power VLSI Circuit Design Demystified and Explained: A Tutorial," IEEE Trans. Circuits Syst. I, Reg. Papers, vol. 59, pp. 3-29, Jan. 2012.

S. V. Kosonocky, et al., "Optimal supply and threshold scaling for subthreshold CMOS circuits," in Proc. 2002 IEEE Computer Society Annu. Symp. VLSI, Pittsburg, PA, Apr. 25-26, 2002, pp. 5-9.

Bo Zhai et al., "Energy-Efficient Subthreshold Processor Design," IEEE Trans. Very Large Scale Integr. (VLSI) Syst., vol. 17, pp. 1127-1137, Aug. 2009.

Y. Pu et al., "Misleading energy and performance claims in sub/near threshold digital systems," in Proc. 2010 IEEE/ACM Int. Conf. Computer-Aided Design (ICCAD), San Jose, CA, Nov. 7-11, 2010, pp. 625-631.

D. Bol et al., "Interests and Limitations of Technology Scaling for Subthreshold Logic," IEEE Trans. Very Large Scale Integr. (VLSI) Syst., vol. 17, pp. 1508-1519, Oct. 2009.

S. Jain et al., "A 280mV-to-1.2V wide-operating-range IA-32 processor in 32nm CMOS," in Digest of Technical Papers 2012 IEEE Int. Solid-State Circuits Conf. (ISSCC), San Francisco, CA, Feb. 19-23, 2012, pp. 66-68.

D. Wolpert and P. Ampadu, "Exploiting Programmable Temperature Compensation Devices to Manage Temperature-Induced Delay Uncertainty," IEEE Trans. Circuits and Syst. I: Reg. Papers, vol. 59, pp. 735-748, Apr. 2012.

BSIM4.3.0 MOSFET Model—User's Manual, Department of Electrical Engineering and Computer Sciences, University of California, Berkeley, CA, 2003.

M. Faisal, N. E. Roberts and D. D. Wentzloff, "A 300nW near-threshold 187.5-500 kHz programmable clock generator for ultra low power SoCs," 2015 IEEE SOI-3D-Subthreshold Microelectronics Technology Unified Conference (S3S), Rohnert Park, CA, 2015, pp. 1-3.

M. Huang and C. Hung, "Full-custom all-digital phase locked loop for clock generation," VLSI Design, Automation and Test(VLSI-DAT), Hsinchu, 2015, pp. 1-4.

J. Liu et al., "A 0.8V, sub-mW, varactor-tuning ring-oscillator-based clock generator in 32nm CMOS," IEEE Asian Solid-State Circuits Conference 2011, Jeju, 2011, pp. 337-340.

A. Tajalli and Y. Leblebici, "A 9 pW/Hz adjustable clock generator with 3-decade tuning range for dynamic power management in subthreshold SCL systems," 2010 Proceedings of ESSCIRC, Seville, 2010, pp. 242-245.

X. Zhang and A. B. Apsel, "A Low-Power, Process-and-Temperature-Compensated Ring Oscillator With Addition-Based Current Source," in IEEE Transactions on Circuits and Systems I: Regular Papers, vol. 58, No. 5, pp. 868-878, May 2011.

Man et al, "A High Slew-Rate Push-Pull Output Amplifier for Low-Quiescent Current Low-Dropout Regulators With Transient-Response Improvement", IEEE Transactions on Circuits and Systems II: Express Briefs, 2007.

(56) References Cited

OTHER PUBLICATIONS

Y. Lu, et al., "A 0.65ns-Response-Time 3.01ps FOM Fully-Integrated Low-Dropout Regulator with Full-Spectrum Power-Supply-Rejection for Wideband Communication Systems", IEEE ISSCC, pp. 306-307, Feb. 2014.

Chen, Y. et. al, "An Ultra-low Quiescent Current Output Capacitor-less Low-Dropout Regulator with a Novel Slew-rate-enhanced Circuit", 2014 IEEE International Symposium on Radio-Frequency Integration Technology.

X. Ming, et al, "A Low-Power Ultra-Fast Capacitor-Less LDO With Advanced Dynamic Push-Pull Techniques", International Conference on VLSI and System-on-Chip, pp. 54-59, 2011.

Liu et al, "An Ultra-Low Power Voltage Regulator for RFID Application", Chia-Chin, Chunhong Chen, 2013 IEEE 56th International Midwest Symposium on Circuits and Systems (MWSCAS).

Liu et al, "A 90nA quiescent current 1.5V-5V 50mA asynchronous folding LDO using dual loop control", 2016 IEEE Asian Solid-State Circuits Conference (A-SSCC).

Mazumdar et al, "A Digitally-Controlled Power-Aware Low-Dropout Regulator to Reduce Standby Current Drain in Ultra-Low-Power MCU", 2015 International Symposium on Quality Electronic Design.

Liang et al, "A 802 nA Quiescent Current and 100 mA Load Low-Dropout Regulator for Micro Energy Harvest System", 2018 2018 13th IEEE Conference on Industrial Electronics and Applications (ICIEA).

Rikan et. al, "A low leakage retention LDO and leakage-based BGR with 120nA quiescent current", 2017 International SoC Design Conference (ISOCC).

Chien-Yi Wu et al, "An ultra-low power capacitor-less LDO for always-on domain in NB-IoT applications", 2018 IEEE International Conference on Applied System Invention (ICASI).

Qian, J. et al. (Dec. 2009). Single-inductor Dual-output DC/DC Buck converter With High full-load Efficiency. 10.1109/EDSSC. 2009.5394235. (3 pages).

Tao, C. et al. (Nov. 2011). A Buck Converter With Reduced Output Spurs Using Asynchronous Frequency Hopping. IEEE Transactions on Circuits and Systems—II: Express Briefs, vol. 58, No. 11, p. 709-713. (5 pages).

Ko, Y. et al. (Jun. 2014) Load-Balance-Independent High Efficiency Single-Inductor Multiple-Output (SIMO) DC-DC Converters. Journal of Semiconductor Technology and Science, vol. 14, No. 3., p. 300-312. (13 pages).

International Application No. PCT/US/2019/012414 International Search Report and Written Opinion dated May 8, 2019.

Solki, Shahin et al. U.S. Appl. No. 16/244,509 Non-Final Office Action dated Mar. 28, 2019.

Solki, Shahin et al. U.S. Appl. No. 16/244,509 Notice of Allowance dated Jul. 17, 2019.

Hedayati, Hajir et al. U.S. Appl. No. 16/295,876 Non-Final Office Action dated Sep. 12, 2019.

Pishdad, Bardia et al. U.S. Appl. No. 16/281,021 Non-Final Office Action dated Jul. 10, 2019.

Ensafdaran, Masoud et al. U.S. Appl. No. 16/265,648 Non-Final Office Action dated Aug. 9, 2019.

Mahmoudi, Farsheed, et al. U.S. Appl. No. 16/240,557 Non-Final Office Action dated Aug. 2, 2019.

Pishdad, Bardia et al. U.S. Appl. No. 16/281,021 Notice of Allowance dated Oct. 17, 2019.

\* cited by examiner

SEMICONDUCTOR PROCESS AND PERFORMANCE SENSOR

RELATED APPLICATIONS

This application claims priority to the provisional application with Ser. No. 62/614,909, titled "Semiconductor Process and Performance Sensor," filed Jan. 8, 2018. The entire contents of the above noted provisional application are incorporated by reference as part of the disclosure of this document

TECHNICAL FIELD

The present disclosure relates to circuits for measuring semiconductor device performance.

BACKGROUND

Many integrated circuits such as systems on a chip (SoC), processors, cell phone chips, and other circuits vary in performance over temperature, vary due to semiconductor process variations, and vary according to where on a wafer the chip was located during processing. Techniques are needed to compensate for these variations and to allow for operating these circuits with power efficiency while guaranteeing the expected performance. While not limited to Internet of Things (IOT), the small form factor, ultra-low power consumption, and low cost requirements make power consumption and high efficiency power management critically important in IoT applications since they directly impact the battery lifetime of the system.

DETAILED DESCRIPTION

A single semiconductor wafer may include tens to thousands of chips replicated on the wafer for mass production. The wafer as a whole is processed according to semiconductor processing techniques to produce chips from the various locations on the wafer that are generally well matched to one another. Even so, the performance of chips from different locations across a wafer can vary. Moreover, processing from wafer to wafer can vary causing the chips from one wafer to perform slightly differently from chips from another wafer. Furthermore, chip performance varies across changing environmental factors such as temperature. Existing design techniques sometimes use worst case conditions for various processing and environmental variables in order to ensure that each chip performed at least at a minimum level. Individual chip testing has also been used to categorize chips according to performance. A manufacturer could charge more for higher performing chips than lower performing chips.

Disclosed in this patent document are techniques that can be used in each chip to determine performance such as timing performance in real time. Among other features, supply voltages and clock rates may be adjusted to compensate for the range of the operating temperature and the variations induced by the chip fabrication processing. The techniques include determining a series of variables that affect performance, determining the sensitivity of paths in the circuit to each variable, duplicating the most sensitive paths and including them in a sensor circuit that can be used in real-time to determine when the chip is performing as required and when it is not, and adjusting one or more supply voltages and/or clock rates when the circuit is not performing as required.

Figure 1:
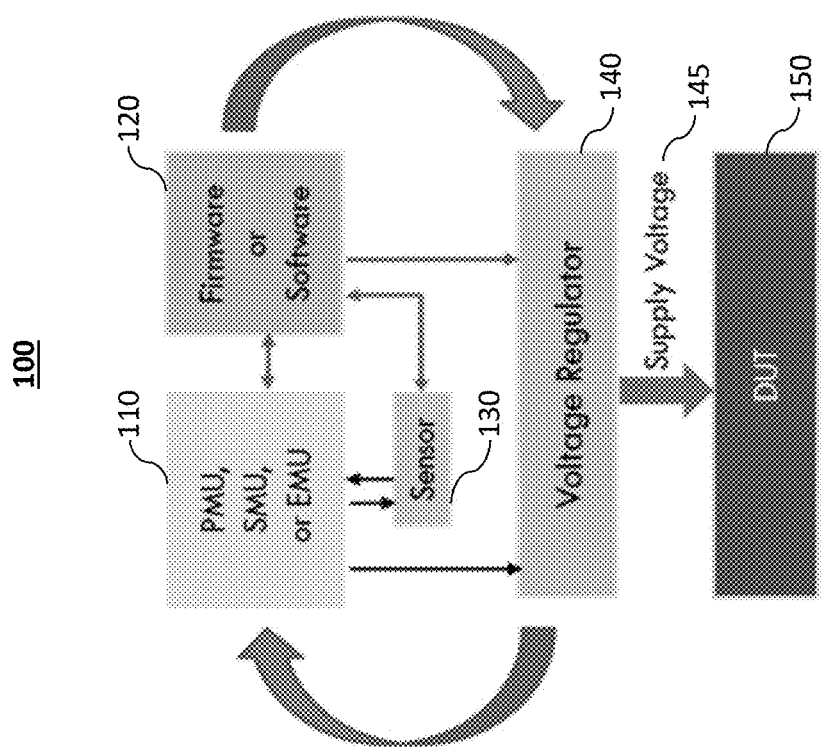
FIG. 1 illustrates a system including a sensor circuit for adjusting clock rate and/or supply voltage to a semiconductor circuit in accordance with some example embodiments.

In the advanced system on chip (SoC) design, the operating voltage for the logic in a device under test (DUT) as depicted in FIG. 1, often is dynamically adjusted to compensate for process and temperature variations. The typical methods to evaluate the process or temperature variations are to use a set of ring-oscillators (RO) or a set of critical paths replica (CPR) as sensors. Based on the sensor output, the supply voltage and/or operation of the DUT is adjusted accordingly. There are several naming conventions for such operation such as: DVS: Dynamic Voltage Scaling, DCVS: Dynamic Core-Voltage Scaling, DVFS: Dynamic Voltage-Frequency Scaling, AVS: Adaptive Voltage Scaling, and AVFS: Adaptive Voltage-Frequency Scaling.

Ring oscillator (RO) sensors provide a relative measure as to how fast or slow a given logic circuit performs post fabrication. However, RO sensors do not cover design specific parameters such as wire delay, and fan-out, which leads to either over-margining or fall-out. To mitigate these shortcomings, extensive post silicon characterization may be performed to determine the required margin for different operating modes. Alternatively, the RO design may be changed to better match the circuit design, but when the design complexity increases, each block of the circuit may require its own set of ROs.

A critical paths replica (CPR) sensor is another technique that addresses some of the concerns with RO sensors by utilizing a set of critical paths (i.e., paths with minimum timing slack at a given process-voltage-temperature (PVT) corner) in the design of the sensors. This approach can cover design sensitivity to some degree, however, it requires a large set of paths to cover different combinations, which leads to a large sensor circuit (area overhead) and increases the power consumption of the circuit.

Furthermore, the physical placement of the sensor, RO or CPR, poses a layout challenge to pick the required conditions from process and IR drop perspectives. IR drop refers to a voltage drop between the voltage source and the logic circuit due the resistance of the power delivery network (PDN).

In some implementations, firmware or software may be used to setup the system and may require a dedicated micro-controller to execute it.

The disclosed embodiments, among other features and benefits, address the shortcomings of prior systems. For example, in contrast to the previous approaches, the disclosed embodiments provide a progressive approach to determine design sensitivity to the process, design and environmental parameters as compared to the CPR method, which only considers the minimum timing slack at the extreme timing corners.

FIG. 1 depicts an example of a system 100 including a sensor circuit for adjusting clock rate and/or supply voltage to a semiconductor circuit, in accordance with some example embodiments. System 100 includes power management unit (PMU)/system management using (SMU)/ energy management unit (EMU) 110 (hereinafter, referred to as PMU 110), sensor 130, and device under test (DUT) 150. DUT 150 is a circuit (such as a processor, a CPU (Central Processing Unit), a GPU (Graphics Processing Unit), a DSP (Digital Signal Processor), a PLD (Programmable Logic Device), an ASIC (Application Specific Integrated Circuits), an SoC (System on Chip), or another circuit) whose performance is being monitored. PMU 110, sensor 130, and DUT 150 may be produced together on a single chip. System 100 also includes voltage regulator 140 producing one or more supply voltages 145. Firmware or software 120 (hereinafter referred to as software 120) may be used to setup, to adjust, to enable or to disable the sensor, and can run on a microcontroller in PMU 110 or may run on a processor included in DUT 150. PMU 110 and software 120 control sensor 130 via registers included in sensor 130. Sensor 130 generates results used to determine if DUT 150 is meeting a performance metric such as meeting a timing requirement. In response to the results, PMU 110 and software 120 may command voltage regulator to adjust up or down one or more voltages being supplied to DUT 150. The sensor 130 and techniques for determining timing paths to include in sensor 130 are further described.

The system 100 also utilizes one or more clocks that are generated using a clock generation circuitry (not shown). For example, the clock generator can include a crystal piezo-electric oscillator, can be constructed using tank circuits and even RC circuits, depending on the application. In some scenarios, the clock signal may be provided via a remote source, through for example an IEEE 1588 connection, a GPS receiver, or through other means. The clock source and/or the voltage source can be integrated with the sensor in the same semiconductor or reside externally on a substrate or a printed circuit board.

One aspect of the disclosed embodiments relates to a profiling operation to analyze a given logic design such as a central processing unit (CPU), graphics processing unit (GPU), digital signal processor (DSP), or another circuit in a selected semiconductor technology to determine the sensitivity to the design and process parameters, and to extract the most sensitive paths related to each parameter. Another aspect of the disclosed embodiments relates to a sensor including an architecture, circuit design and implementation of a sensor that may be used to represent the logic design. As will be described in more detail, the sensor is designed to be representative of specific delay paths through the logic design from which a supply voltage to the logic circuit and/or a clock frequency may be adjusted to keep the logic timing within a predetermined tolerance.

Figure 2:
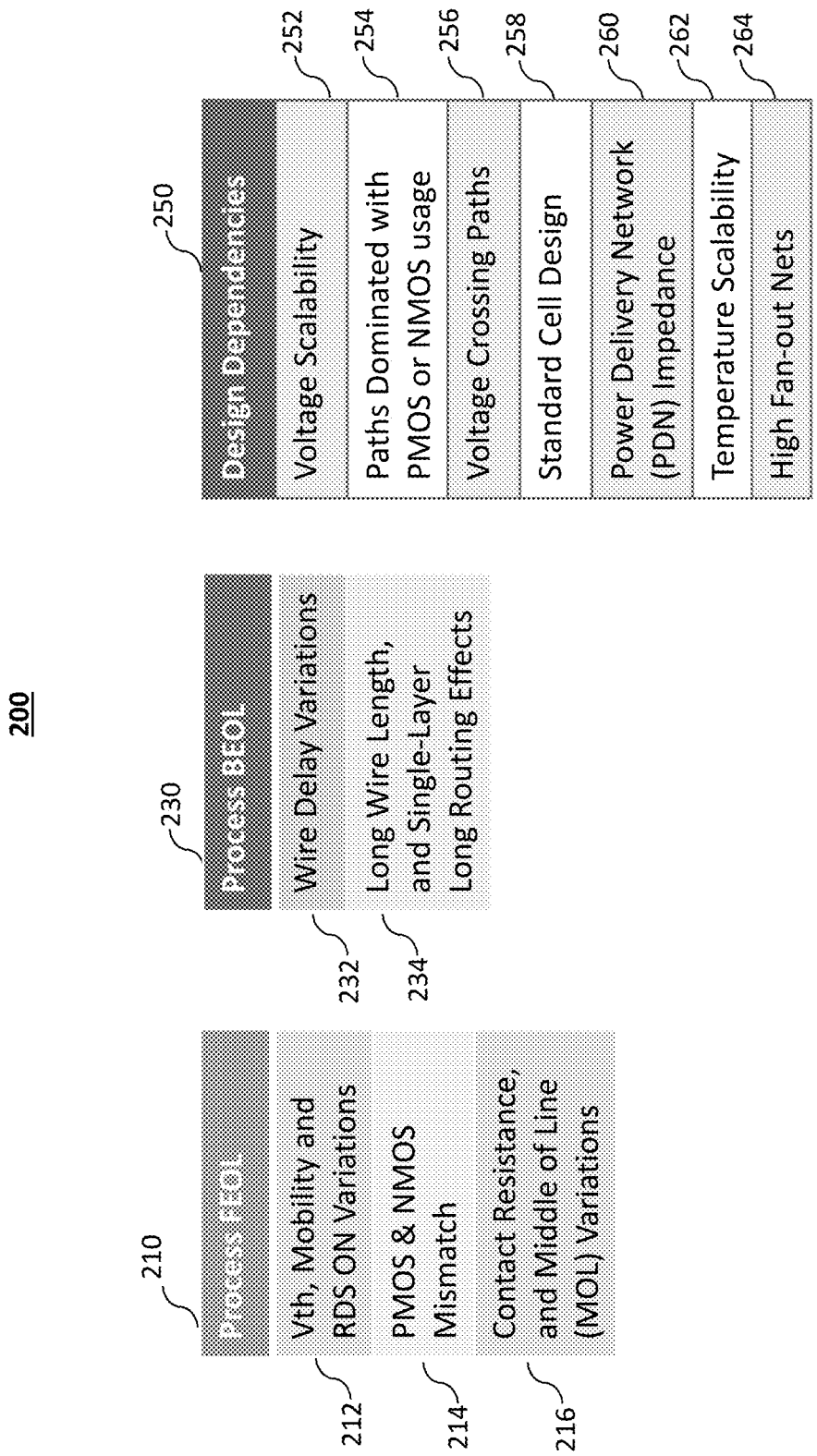
FIG. 2 illustrates a systematic binning operation for classifying parameters having design and process dependencies in accordance with some example embodiments.

FIG. 2 depicts a representation of a systematic approach that is used to list the parameters which define the design and process dependencies, which may lead to a timing failure. It should be noted that the listing in FIG. 2 is not intended to be exhaustive, and the listing can include additional or fewer items. For example, new mechanisms, which are found during or after the design cycle, can be added to the list. The design timing paths are extracted and placed in logical bins based on each parameter at the required PVT corners to determine the design sensitivity to each given parameter.

FIG. 2 depicts some example parameters associated with the different bins. The parameters include front-end of line (FEOL) parameters 210, back-end of line (BEOL) parameters 230, and design dependencies 250. Front-end of line parameters 210 include parameters such as threshold voltage (Vth)/mobility/drain-source resistance (RDS ON) 212, mismatch between n-type devices and p-type devices 214, and contact resistance and middle of line (MOL) variations 216, as well as other parameters. Back-end of line parameters 230 include parameters such as wire delay 232 and effects of a long routing on a single layer 234, as well as other parameters. Design dependencies 250 include parameters such as design voltage scalability 252, paths dominated with PMOS or NMOS 254, voltage crossing paths 256, standard cell design 258, power delivery network (PDN) impedance 260, design temperature scalability 262, and high fan-out nets 264, as well as other parameters.

A path most sensitive to each of the parameters is selected from each bin to use as a representative timing path in the sensor. For example, a representative path may be selected for each parameter. The representative paths may be duplicated in the sensor so that the sensor timing performance is representative of the most sensitive paths in the DUT 150. By the sensor meeting timing requirements, the logic design too will meet the timing requirements. Each selected representative path is used to determine the timing sensitivity of the design (change of timing slack per unit change of parameter, e.g., for temperature scalability ps/C or for voltage scalability in ps/mV to the associated parameter).

Note that the absolute value of the slack may not be the deciding factor. Instead, the maximum amount of slack change per parameter may be the deciding factor. It is important to point out one advantage of the above methodology to the CPR method, since a path selected in accordance with the disclosed technology having a relatively large timing slack evaluated at a given timing corner may not be considered critical (and thus may not be included in the CPR method); yet such a path may quickly loose its margin if one or more process parameters are skewed outside of the process window leading to a timing failure. Based on the disclosed approach of the present document, such a path would be included given its higher sensitivity. Furthermore, in the CPR approach, the only way to increase the design coverage is to increase the number of selected paths, which often leads to hundreds (or more) paths. In this approach, since the most sensitive paths are selected, the total number of paths utilized as the sensor are reduced.

The outcome is a sensitivity table with the list of most sensitive paths. The design can then be improved by modifying it to reduce its sensitivity to the given parameters, where possible. This step can be repeated to refine the design and to update the selected paths.

Further, the most sensitive paths from each bin can be compared in order to remove/merge redundant or similar paths. Additional filtering can be done to exclude paths which are not practical to use. The outcome of this stage is a collection of paths representing the design. This collection can be used to implement the sensor.

At the end of the profiling process, a set of paths is selected from the DUT design that is representative of the most sensitive paths with respect to each of the parameters. Notably, the set of paths representing the design is extracted from the design of the DUT. In the context of this application, the term "most sensitive" path is used to convey the selection of one or more paths that exhibit a high or a highest sensitivity (with respect to a parameter) compared to other paths that are analyzed or evaluated. It is understood that the most sensitive path may or may not produce the most sensitivity (with respect to a parameter) in its theoretical sense.

Figure 3:
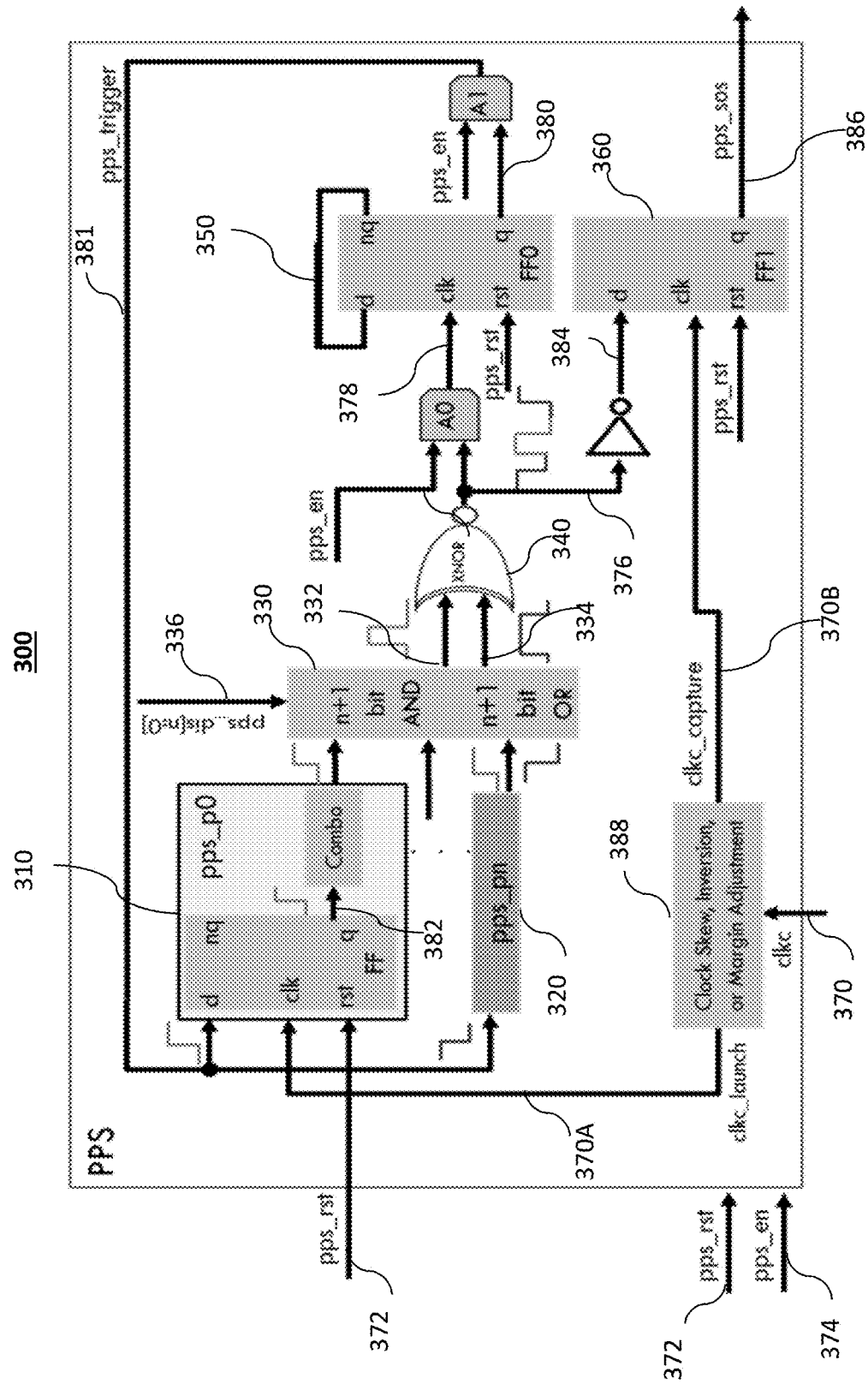
FIG. 3 is an example sensor circuit in accordance with some example embodiments.

FIG. 3 depicts an example circuit topology to dynamically evaluate the DUT timing to provide an indication whether the operating voltage or the clock frequency need to be adjusted to avoid a timing failure.

As noted earlier in connection with the profiling aspect of the disclosed embodiments, a set of paths are selected for implementation in the sensor 300. Each selected path is depicted as pps_p0 (path index zero) 310 to ppspn (path index n) 320, where n+1 represents the number of desired paths (e.g., 8). Each path has a launch flop, which can be reset by pps_rst 372, and clocked by clkc_launch 370A with the input data pin connected to a signal called pps_trigger 381. The output of the launch clock 370A goes through combinational logic, which is extracted from the design. The output of all paths are merged to generate two signals: a) the logical AND of all signals (pps_and 332) and b) the logical OR of all signals (pps_or 334).

When a rising edge is propagating through all paths, and all paths are adjusted to have a non-inverting output, pps_or 334 will change to logic high when the first path's output goes to logic level 1, and pps_and 332 will go to logic high when the last path's output goes to logic level 1. When a falling edge is propagating through all paths, pps_and 332 will go to logic low when the first path's output goes to logic level low and pps_or 334 will change to logic level low when the last path's output goes to logic level zero. It should be noted that in this configuration, the logical AND and OR outputs are not sensitive to a specific ordering of the selected paths, but rather the OR output 334 toggles when a first path (corresponding to any of the paths pps0 to ppsn) transitions, and the AND output 332 toggles when the last path (corresponding to any of the paths pp0 to ppsn) transitions.

The exclusive NOR performed by exclusive NOR gate 340 with inputs pps_and 332 and pps_or 334 generates a set of rising and falling edges for each input level (high or low) fed into the paths. The edges are used to toggle the input edge to the paths by toggling the output of FF0 (pps_trigger 381). The edges are also used to determine if the largest path delay (out of "n+1" paths) is less than the clock cycle or not, which is captured by FF1, where pps_sos 386 is high when the largest delay is longer than the clock cycle.

Sensor 300 indicates that a timing requirement is not being met when the pps_sos 386 output is active. In particular, the supply voltage may not be sufficient for the given clock rate. Sensor 300 indicates that the supply voltage is sufficient for the given clock rate when the pps_sos 386 output is inactive. In the example of FIG. 3, pps_sos 386 is active when it is high and inactive when low. In other embodiments pps_sos 386 may be active when low and inactive when high. When pps_sos 386 is active, system 100 may increase the supply voltage produced by voltage regulator 140 by one or more voltage steps and/or may reduce the frequency of the clock 370 (sometimes referred to as the system clock). By increasing a supply voltage, the DUT circuit and corresponding sensor 130 may speed up. By decreasing the clock rate, more time is available for the timing delays in the DUT 150 and corresponding sensor 130.

Each path can be disabled using a pps_dis 386 signal, one per path, by, for example, masking the path output for "AND" and "OR" circuits to make the path output logically neutral.

An enable signal is added, pps_en 374, to reinitialize the sensor when it is being configured or to disable the sensor when it is not required, thereby saving power.

A programmable or fixed delay can be inserted between the merged path's outputs and the capture flops to increase the sensor delay margin as required (not depicted in FIG. 3) beyond the combinational logic already added.

For further flexibility and post silicon correlation, the launch clock 370A and capture clock 370B can individually be delayed to increase or decrease the delay margin via a delay chain of logic or other means, as represented by the timing adjustment circuitry 388 in FIG. 3 that receives the clkc 370. In some implementations, such a block can be implemented as a programmable block. In some embodiments, the launch or capture clocks can be inverted to cover falling-to-falling, rising-to-falling, or falling-to-rising edge combinations of logic circuits with half-clock cycle paths or inverted-clock paths.

In some example embodiments, a logic circuit design is represented by paths which are based on its sensitivity to a set of parameters, such as, but not limited those depicted in FIG. 2.

The outputs from multiple paths may be merged into one signal using combinational logic such as, but not limited to, "AND," "OR," or "XNOR" circuits described above or as in FIG. 3.

A programmable or a fixed delay may be inserted between the combined paths output and the capture and/or trigger flops to set, increase or adjust the sensor delay margin.

The circuit in FIG. 3 may be used as a custom circuit design, synthesizable Verilog, System-Verilog or RTL code, which may be translated to different gate-level implementations by a compiler or hybrid of the two methods.

Disable signals (pps_dis 336) or enable signals (pps_en 374) may be used to control the toggle rate of the paths to adjust the sensor aging to match that of the given design.

The PPS sensor may be used for static (one-time), dynamic (open loop, lookup table, DVS, DVFS or DCVS) or adaptive (closed loop, AVS, or AVFS) adjustment of the supply voltage or the clock frequency of the given circuit.

The PPS sensor may be an integrated or an add-on part of a system used for power or energy management of a CPU, GPU, ASIC, PLD, FPGA or SoC.

An active high or an active low signal polarity may be used for one or more of the signals pps_rst 372, pps_en 374, or pps_dis 336.

Different flip-flop or latch types may be used in the DUT, for the launch, capture or trigger flip-flops depicted in FIG. 3.

Additional flip-flops per path may be added to generate multi-clock cycle paths or output signal pps_sos 386. Additionally, one or more extra flop can be added to each path to reduce the sensor bandwidth, to make the decision regarding clock or voltage adjustment every other clock cycle. In some implementations, one or more of the sub-blocks may operate at the half the clock frequency of the main block; in these implementations, two flops can be implemented in the corresponding sub-blocks.

A programmable delay may be used (e.g., as part of the clock adjustment circuitry 388) to skew the launch or capture clock to match the clock skew in the design, to invert the clock, to adjust the timing margin of the sensor, or to make other adjustments to the clock 370 as needed.

The launch or capture clock may be inverted to utilize a fall-to-fall, rise-to-fall or fall-to-rise relation between the launch and capture clock to cover half-cycle paths, inverted clocks, or to generate half-clock cycle phase shift.

Figure 4:
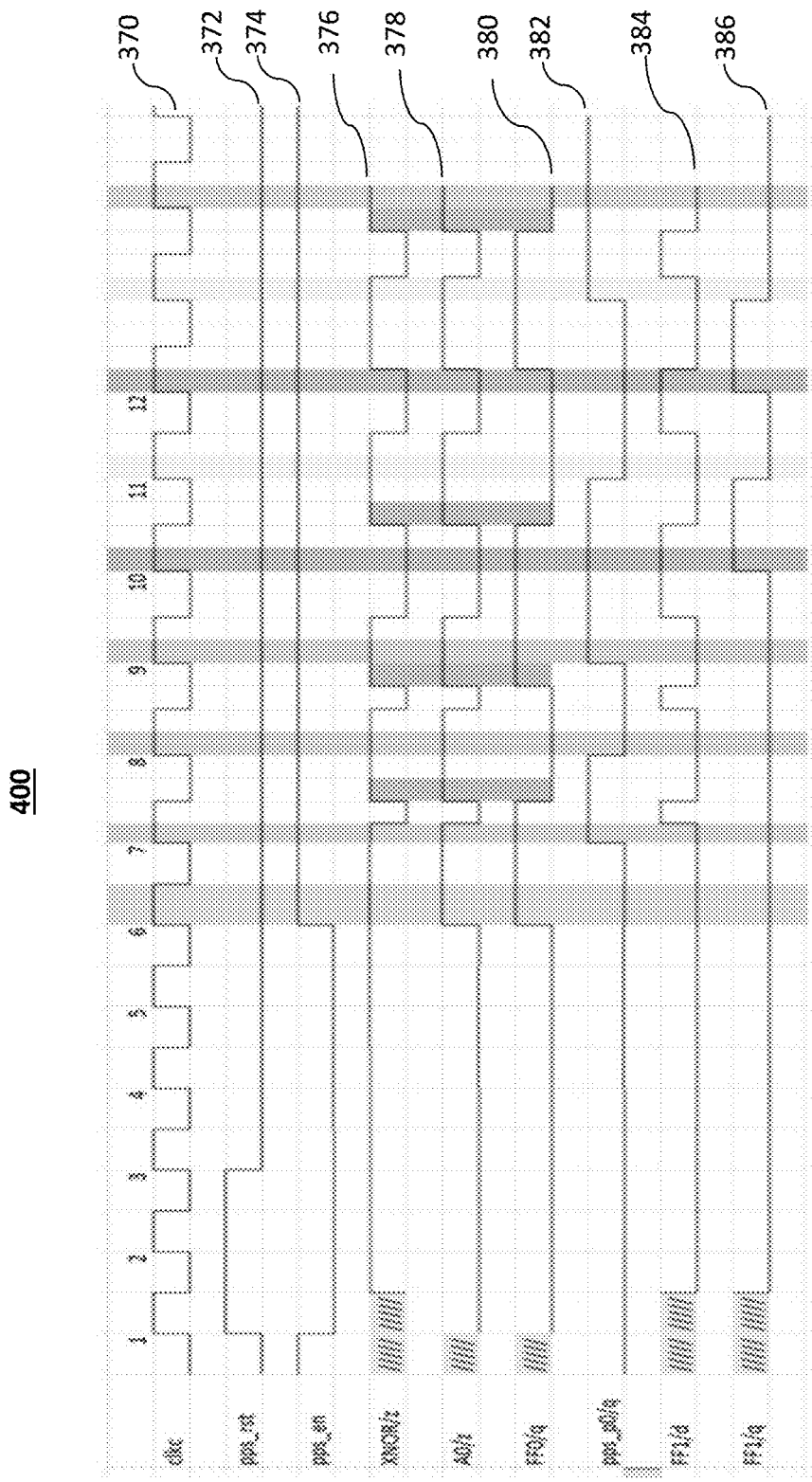
FIG. 4 illustrates an example timing diagram for the example sensor configuration of FIG. 3.

FIG. 4 depicts an example of a timing diagram to illustrate both pps_sos (FF1/q) 386 logic high and logic low conditions that are produced in accordance with the circuit configuration of FIG. 3. As illustrated in FIG. 4, certain transitions in lines 378 through 386 occur after the initial reset (pps_rst going from high to low), and after the enable input is activated (pps_en going from low to high). In this example, the output pps_sos 386 transitions from low to high at the rising edges of clock cycles 10 and 12, indicating that a timing requirement is not being met. Such an output can be provided to a voltage regulator and/or to a clock generation circuit to adjust one or both of the supply voltage or the clock rate.

It should be noted that disclosed sensor circuit can be used one-time to determine the starting clock rate or supply voltage of a semiconductor circuit, can be used periodically or intermittently (e.g., as a circuit ages), and/or dynamically in a closed-loop fashion to dynamically adjust a clock rate or a supply voltage for the semiconductor circuit in operation. Furthermore, the disclosed sensor circuit can be implemented using a synthesizable code, a custom harden circuit, logic gates, or transistors.

Figure 5:
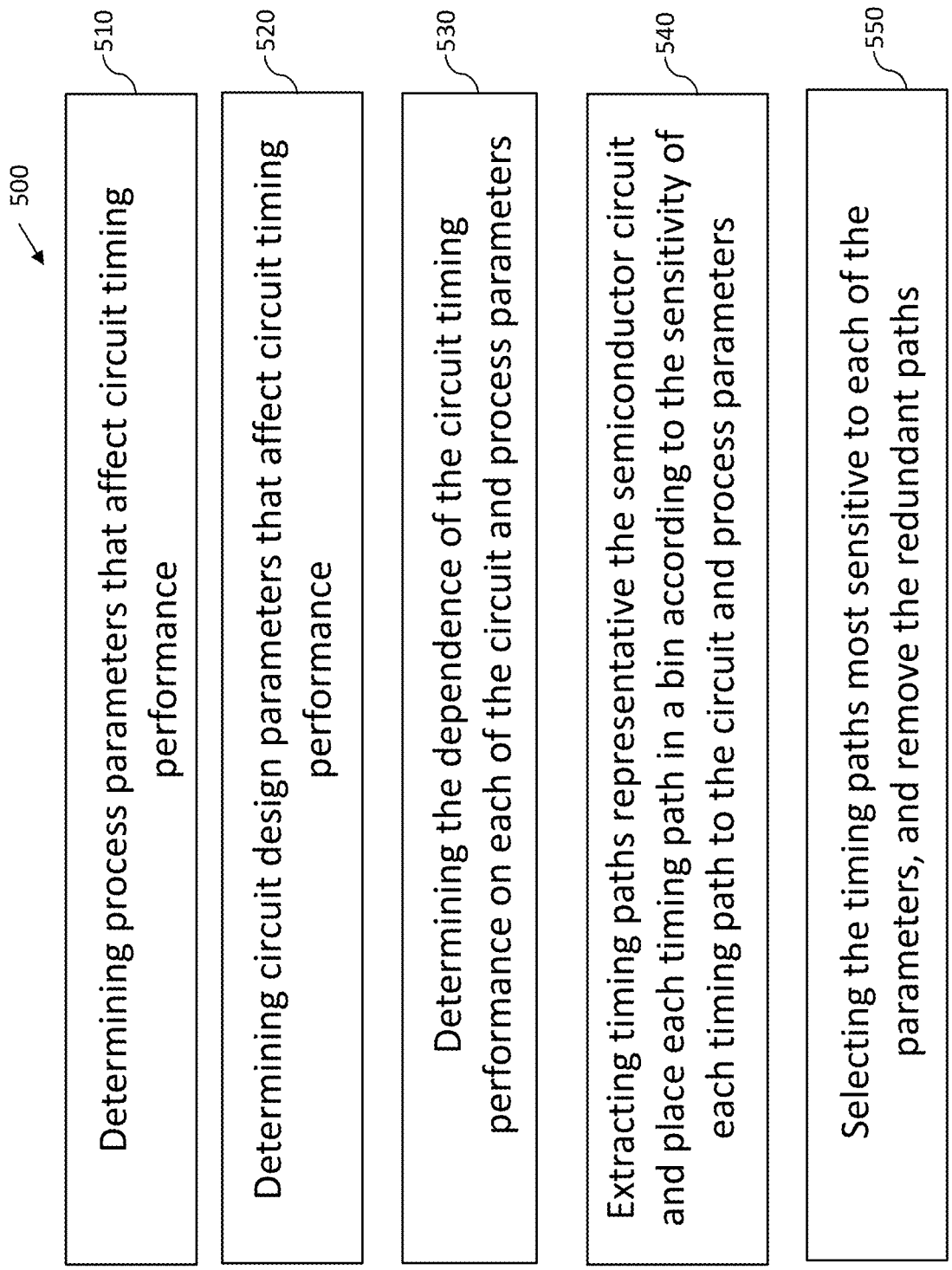
FIG. 5 illustrates a set of operations for generating a profile of a semiconductor circuit in accordance with some example embodiments.

FIG. 5 illustrates a set of example operations 500 for generating a profile of a semiconductor circuit in accordance with some example embodiments. At 510 and 520, circuit and process parameters that affect circuit timing performance are determined. At 530, the dependence of the circuit timing performance on each of the circuit and process parameters is determined. At 540, timing paths representative the semiconductor circuit are extracted and each timing path is placed in a bin according to the sensitivity of each timing path to the circuit and process parameters. At 550, the timing paths most sensitive to each of the parameters are selected. In some example embodiments, the circuit and process parameters include one or more of a transistor threshold voltage, and electron mobility, a drain-source resistance, a mismatch between n-type devices and p-type devices, a contact resistance, a wire delay, a routing on a single layer, a voltage scalability, a heavy PMOS or NMOS path, a voltage crossing path, a standard cell design, a power delivery impedance, a temperature scalability, and a high fan-out net.

Another example aspect of the disclosed embodiments relates to a method of operating a semiconductor circuit that includes operating a circuit performance sensor to determine when the semiconductor circuit is meeting a timing requirement, and adjusting, when the timing requirement is not being met, a supply voltage or a clock frequency to cause the semiconductor circuit to meet the timing requirement. In one example embodiment, when the timing requirement is not being met, a voltage regulator increases its output voltage. In another example embodiment, when the timing requirement is not being met, a toggle rate of a system clock is decreased.

Another example aspect of the disclosed technology relates to a semiconductor circuit performance sensor apparatus that includes a plurality of timing paths, where each timing path has an input and an output, and where each timing path is selected to be representative of a semiconductor circuit parameter dependent on one or more of a temperature and a semiconductor process parameter. This apparatus also includes an AND gate with a plurality of inputs and a first gate output, where the outputs from each of the timing paths are connected to an input of the AND gate, and an OR gate with another plurality of inputs and a second gate output, where the outputs from each of the timing paths are connected to an input of the OR gate. The apparatus further includes an exclusive NOR gate with a plurality of inputs and a third gate output, where the inputs of the exclusive NOR gate include the first gate output and the second gate output, and a trigger flip-flop clocked by the third gate output, where a trigger output drives the input to each timing path. A timing flip-flop is also included in the apparatus whose data input is related to the third gate output and whose output indicates when a timing requirement is being met and when the timing requirement is not being met. In one example embodiment, when the timing flip-flop output indicates the timing requirement is not being met, the apparatus causes a voltage regulator supplying power to the apparatus to increase its output voltage. In another example embodiment, when the timing flip-flop output indicates the timing requirement is not being met, the apparatus causes a clock signal clocking the apparatus to decrease its toggle rate.

Another aspect of the disclosed embodiments relates to a method for generating a profile of a semiconductor circuit to facilitate real-time adjustment of the semiconductor performance. The method includes determining circuit and process parameters that affect circuit timing performance, determining a dependence of the circuit timing performance on each of the circuit and process parameters, extracting a plurality of timing paths representative of the semiconductor circuit and placing each timing path in a bin according to the sensitivity of each timing path to the circuit and process parameters, and selecting the timing paths most sensitive to each of the parameters to enable a determination of an adjustment of a voltage supply or a clock rate to the semiconductor circuit based on a performance indicator of the selected timing paths.

In one example embodiment, the circuit and process parameters include one or more of a front-end of line (FEOL) parameters, a back-end of line (BEOL) parameters, or design dependency parameters. In another example embodiment, the FEOL parameters include one or more of a transistor threshold voltage, an electron mobility, a drain-source resistance, a mismatch between n-type devices and p-type devices, or a contact resistance. In still another example embodiment, the BEOL parameters include one or more of a wire delay or a routing on a single layer. In yet another example embodiment, the design dependency parameters include one or more of a voltage scalability, a heavy PMOS or NMOS path, a voltage crossing path, a standard cell design, a power delivery impedance, a temperature scalability, or a high fan-out net.

According to some example embodiments, selecting the timing paths most sensitive to each of the parameters includes selecting the timing paths having a maximum amount of slack change for one or more parameters. For example, the maximum amount of slack for parameter temperature scalability is measured in the units of time per degree Celsius, and the maximum amount of slack for parameter voltage scalability is measured in the units of time per voltage. In another example embodiment, the above noted method further includes designing a sensor circuit that includes the selected timing paths so that a timing performance of the sensor circuit is representative of the selected timing paths that are most sensitive to each of the parameters. In yet another example embodiment, the sensor circuit includes an output signal representative of the output performance indicator. In another example embodiment, the sensor circuit output produces a first value or a first level indicative of an underperformance of the semiconductor circuit upon a determination of a timing or a slack deficiency associated with any one of the selected timing paths. In still another example embodiment, the above method includes determining that a timing requirement of the selected timing paths is not being met, and providing an indication to (a) dynamically increase a voltage to the semiconductor circuit, or (b) dynamically decrease a clock rate provided to the semiconductor circuit.

Another aspect of the disclosed embodiments relates to a performance sensor apparatus that includes a plurality of timing paths, where each timing path has an input and an output, and where each timing path is representative of a path in a semiconductor circuit. Each timing path is associated with a particular parameter dependent on one or more of a temperature or a semiconductor process. The performance sensor apparatus further includes a logic circuit having a plurality of inputs and at least one output, where the output from each of the timing paths is coupled to an input of the logic circuit. The performance sensor apparatus also includes a trigger circuit having a clock input obtained from the output of the logic circuit, and a timing circuit having an input that is related to the output of the logic circuit and having an output that changes from a first level to a second level upon a determination that a timing requirement for at least one of the timing paths is not met.

In one example embodiment, the timing paths are implemented using combinational logic circuits. In another example embodiment, the logic circuit includes an AND gate configured to receive each of the plurality of inputs of the logic circuit, the AND gate having an output, an OR gate configured to receive each of the plurality of inputs of the logic circuit, the OR gate having an output. The outputs of the AND gate and the OR gate are coupled to the at least one output of the logic circuit. In another example embodiment, the outputs of the AND gate and the OR gate are coupled to inputs of an exclusive NOR gate, and the output of the exclusive NOR gate is connected to the at least one output of the logic circuit. In still another example embodiment, an output of the trigger circuit is operable to provide a trigger signal to a launch flip flop for one or more of the timing paths.

According to another example embodiment, the above performance sensor apparatus further includes a clock adjustment circuit including an input configured to receive a system clock, a launch clock output coupled to each of the timing paths, and a capture clock output coupled to a clock input of the timing circuit. The clock adjustment circuit is configured to apply one or more of a clock skew adjustment, clock inversion or a margin adjustment in generating the launch clock or the capture clock. In another example embodiment, the clock adjustment circuit includes one or more programmable delay circuits. In still another example embodiment, the input of the timing circuit is configured to receive a logical inverse of the output of the logic circuit. In yet another example embodiment, the performance sensor apparatus includes one or more programmable or fixed delay circuits positioned after the output of the one or more timing paths to provide further adjustment for a delay margin of the performance sensor. In another example embodiment, each timing path represents a most sensitive path with respect to the particular parameter associated with that path, wherein the most sensitive path is characterized as having a largest amount of slack change for the particular parameters compared to other paths.

Another aspect of the disclosed technology relates to a system for sensing performance of a semiconductor circuit. The system includes a performance sensor that includes a system clock input configured to receive a clock signal, a plurality of timing paths, where each timing path has an input and an output, each timing path is representative of a path in a semiconductor circuit and each timing path is associated with a particular parameter dependent on one or more of a temperature or a semiconductor process. The performance sensor further includes a logic circuit having a plurality of inputs and at least one output, wherein the output from each of the timing paths is coupled to an input of the logic circuit, a trigger circuit having a clock input obtained from the output of the logic circuit, and a timing circuit having an input that is related to the output of the logic circuit and having an output that changes from a first level to a second level upon a determination that a timing requirement for at least one of the timing paths is not met. The above noted system also includes a voltage regulator circuit coupled to the output of the performance sensor. The voltage regulator is configured to receive a source voltage and to adjust a value of the source voltage based on the output of the performance sensor.

In one example embodiment, the voltage regulator is configured to increase the source voltage output based on the output of the timing circuit. In another example embodiment, the output of the timing circuit is coupled to a clock generation circuitry to cause a change in system clock rate based on the output of the timing circuit. In yet another example embodiment, the above noted system further includes the semiconductor circuit, and the performance sensor is operable to provide the output of the timing circuit to the voltage regulator or to a clock generator in real time during an operation of the semiconductor circuit, where the voltage regulator or the clock generator are configured to adjust one or both of the value of the supply voltage or a system clock rate based on the output of the timing circuit.

The subject matter described herein may be embodied in systems, apparatus, methods, and/or articles depending on the desired configuration. For example, at least a portion of the systems, apparatus, methods, and/or articles described herein can be implemented using one or more of the following: one or more semiconductor materials or substrates such as silicon, printed circuit board techniques, discrete electronic components such as transistors, inductors, capacitors, resistors, and the like, a processor executing program code, an application-specific integrated circuit (ASIC), a digital signal processor (DSP), an embedded processor, a field programmable gate array (FPGA), and/or combinations thereof. These various example embodiments may include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. In the context of this document, a "machine-readable medium" may be any non-transitory media that can contain, store, communicate, propagate or transport the instructions for use by or in connection with an instruction execution system, apparatus, or device, such as a computer or data processor circuitry. A computer-readable medium may comprise a non-transitory computer-readable storage medium that may be any media that can contain or store the instructions for use by or in connection with an instruction execution system, apparatus, or device, such as a computer. Furthermore, some of the embodiments disclosed herein include computer programs configured to cause methods as disclosed herein.

Although a few variations have been described in detail above, other modifications or additions are possible. In particular, further features and/or variations may be provided in addition to those set forth herein. Additionally, different disclosed embodiments may be combined. Moreover, the example embodiments described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

Similarly, while operations are depicted in the drawings or explained as examples in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A performance sensor apparatus, comprising:
a plurality of timing paths, wherein each timing path has an input and an output, and wherein each timing path is representative of a path in a semiconductor circuit, each timing path associated with a particular parameter dependent on one or more of a temperature or a semiconductor process;
a logic circuit having a plurality of inputs and at least one output, wherein the output from each of the timing paths is coupled to an input of the logic circuit;
a trigger circuit having a clock input obtained from the output of the logic circuit; and
a timing circuit having an input that is related to the output of the logic circuit and having an output that changes from a first level to a second level upon a determination that a timing requirement for at least one of the timing paths is not met.

2. The apparatus of claim 1, wherein the timing paths are implemented using combinational logic circuits.

3. The apparatus of claim 1, wherein the logic circuit comprises:
an AND gate configured to receive each of the plurality of inputs of the logic circuit, the AND gate having an output; and
an OR gate configured to receive each of the plurality of inputs of the logic circuit, the OR gate having an output, wherein the outputs of the AND gate and the OR gate are coupled to the at least one output of the logic circuit.

4. The apparatus of claim 3, wherein the outputs of the AND gate and the OR gate are coupled to inputs of an exclusive NOR gate, and the output of the exclusive NOR gate is connected to the at least one output of the logic circuit.

5. The apparatus of claim 1, wherein an output of the trigger circuit is operable to provide a trigger signal to a launch flip flop for one or more of the timing paths.

6. The apparatus of claim 1, wherein the input of the timing circuit is configured to receive a logical inverse of the output of the logic circuit.

7. The apparatus of claim 1, further including one or more programmable or fixed delay circuits positioned after the output of the one or more timing paths to provide further adjustment for a delay margin of the performance sensor apparatus.

8. The apparatus of claim 1, wherein each timing path represents a most sensitive path with respect to the particular parameter associated with that path, wherein the most sensitive path is characterized as having a largest amount of slack change for the particular parameters compared to other paths.

9. A performance sensor apparatus, comprising:
a plurality of timing paths, wherein each timing path has an input and an output, and wherein each timing path is representative of a path in a semiconductor circuit, each timing path associated with a particular parameter dependent on one or more of a temperature or a semiconductor process;
a logic circuit having a plurality of inputs and at least one output, wherein the output from each of the timing paths is coupled to an input of the logic circuit;
a trigger circuit having a clock input obtained from the output of the logic circuit; and
a timing circuit having an input that is related to the output of the logic circuit and having an output that changes from a first level to a second level upon a determination that a timing requirement for at least one of the timing paths is not met, the performance sensor apparatus further including a clock adjustment circuit including:
an input configured to receive a system clock,
a launch clock output coupled to each of the timing paths, and
a capture clock output coupled to a clock input of the timing circuit, wherein the clock adjustment circuit is configured to apply one or more of a clock skew adjustment, clock inversion or a margin adjustment in generating the launch clock or the capture clock.

10. The apparatus of claim 9, wherein the clock adjustment circuit includes one or more programmable delay circuits.

11. The apparatus of claim 9, wherein the logic circuit comprises:
an AND gate configured to receive each of the plurality of inputs of the logic circuit, the AND gate having an output; and
an OR gate configured to receive each of the plurality of inputs of the logic circuit, the OR gate having an output, wherein the outputs of the AND gate and the OR gate are coupled to the at least one output of the logic circuit.

12. The apparatus of claim 11, wherein the outputs of the AND gate and the OR gate are coupled to inputs of an exclusive NOR gate, and the output of the exclusive NOR gate is connected to the at least one output of the logic circuit.

13. The apparatus of claim 9, wherein the input of the timing circuit is configured to receive a logical inverse of the output of the logic circuit.

14. The apparatus of claim 9, further including one or more programmable or fixed delay circuits positioned after the output of the one or more timing paths to provide further adjustment for a delay margin of the performance sensor apparatus.

15. The apparatus of claim 9, wherein each timing path represents a most sensitive path with respect to the particular parameter associated with that path, wherein the most sensitive path is characterized as having a largest amount of slack change for the particular parameters compared to other paths.

16. The apparatus of claim 9, wherein an output of the trigger circuit is operable to provide a trigger signal to a launch flip flop for one or more of the timing paths.

17. A system for sensing performance of a semiconductor circuit, the system comprising:
   a performance sensor, comprising:
      a system clock input configured to receive a clock signal,
      a plurality of timing paths, wherein each timing path has an input and an output, each timing path is representative of a path in a semiconductor circuit and each timing path is associated with a particular parameter dependent on one or more of a temperature or a semiconductor process,
      a logic circuit having a plurality of inputs and at least one output, wherein the output from each of the timing paths is coupled to an input of the logic circuit,
      a trigger circuit having a clock input obtained from the output of the logic circuit, and
      a timing circuit having an input that is related to the output of the logic circuit and having an output that changes from a first level to a second level upon a determination that a timing requirement for at least one of the timing paths is not met; and
   a voltage regulator circuit coupled to the output of the performance sensor, the voltage regulator configured to receive a supply voltage and to adjust a value of the supply voltage provided to the semiconductor circuit based on the output of the performance sensor.

18. The system of claim 17, wherein the logic circuit comprises:
   an AND gate configured to receive each of the plurality of inputs of the logic circuit, the AND gate having an output; and
   an OR gate configured to receive each of the plurality of inputs of the logic circuit, the OR gate having an output, wherein the outputs of the AND gate and the OR gate are coupled to the at least one output of the logic circuit.

19. The system of claim 18, wherein the outputs of the AND gate and the OR gate are coupled to inputs of an exclusive NOR gate, and the output of the exclusive NOR gate is connected to the at least one output of the logic circuit.

20. The system of claim 17, wherein an output of the trigger circuit is operable to provide a trigger signal to a launch flip flop for one or more of the timing paths.

21. The system of claim 17, further including a clock adjustment circuit including:
   an input coupled to the system clock input,
   a launch clock output coupled to each of the timing paths, and
   a capture clock output coupled to a clock input of the timing circuit, wherein the clock adjustment circuit is configured to apply one or more of a clock skew adjustment, clock inversion or a margin adjustment in generating the launch clock or the capture clock.

22. The system of claim 17, wherein the voltage regulator is configured to increase the supply voltage based on the output of the timing circuit.

23. The system of claim 17, the output of the timing circuit is coupled to a clock generation circuitry to cause a change in system clock rate based on the output of the timing circuit.

24. The system of claim 17, further including the semiconductor circuit, wherein the performance sensor is operable to provide the output of the timing circuit to the voltage regulator or to a clock generator in real time during an operation of the semiconductor circuit, and wherein the voltage regulator or the clock generator are configured to adjust one or both of the value of the supply voltage or a system clock rate based on the output of the timing circuit.

* * * * *